Patented Oct. 17, 1922.

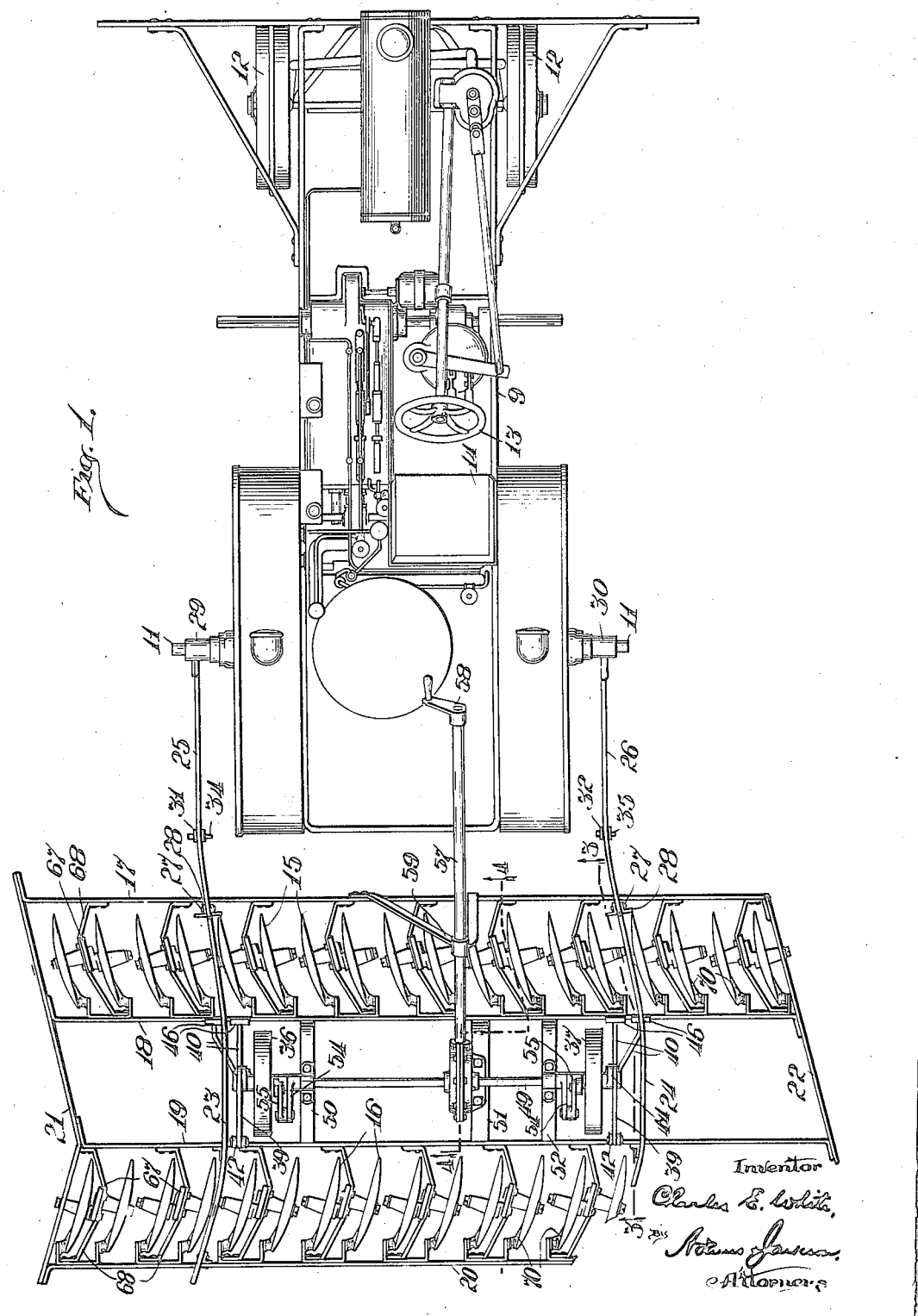

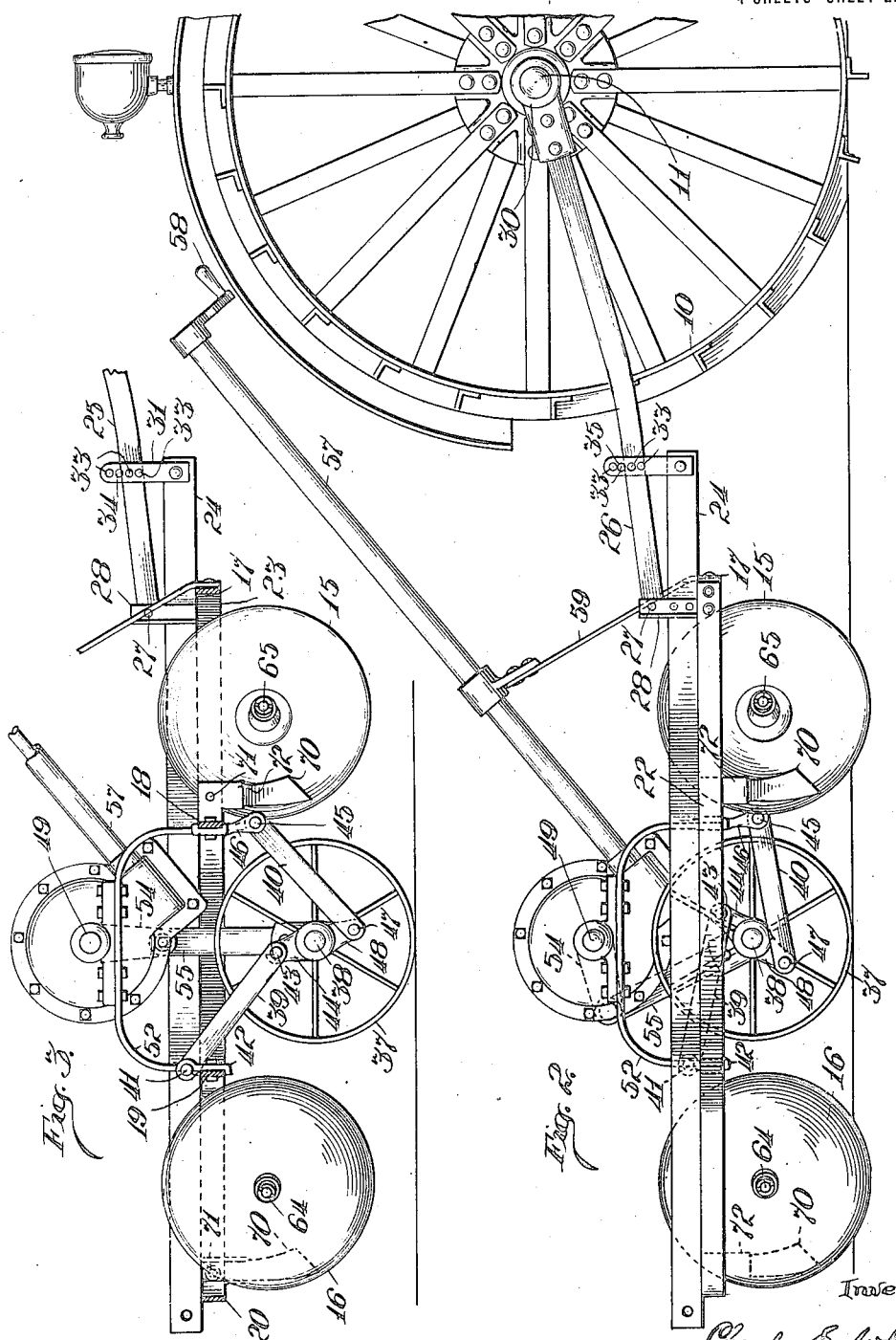

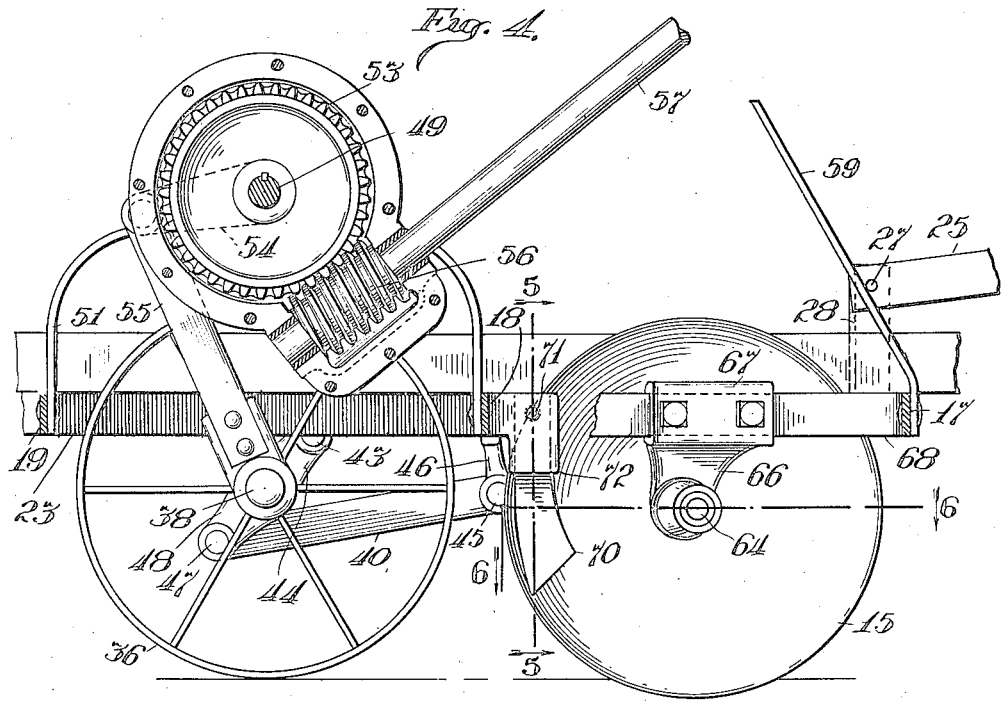
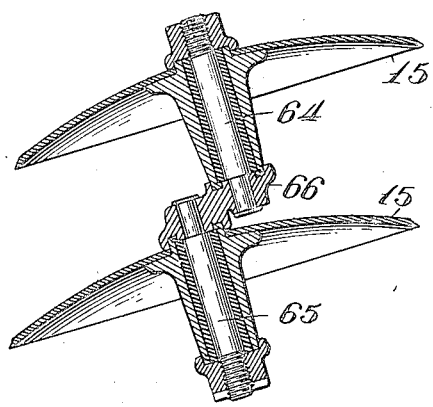
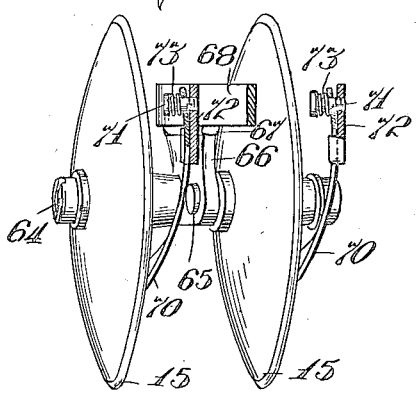

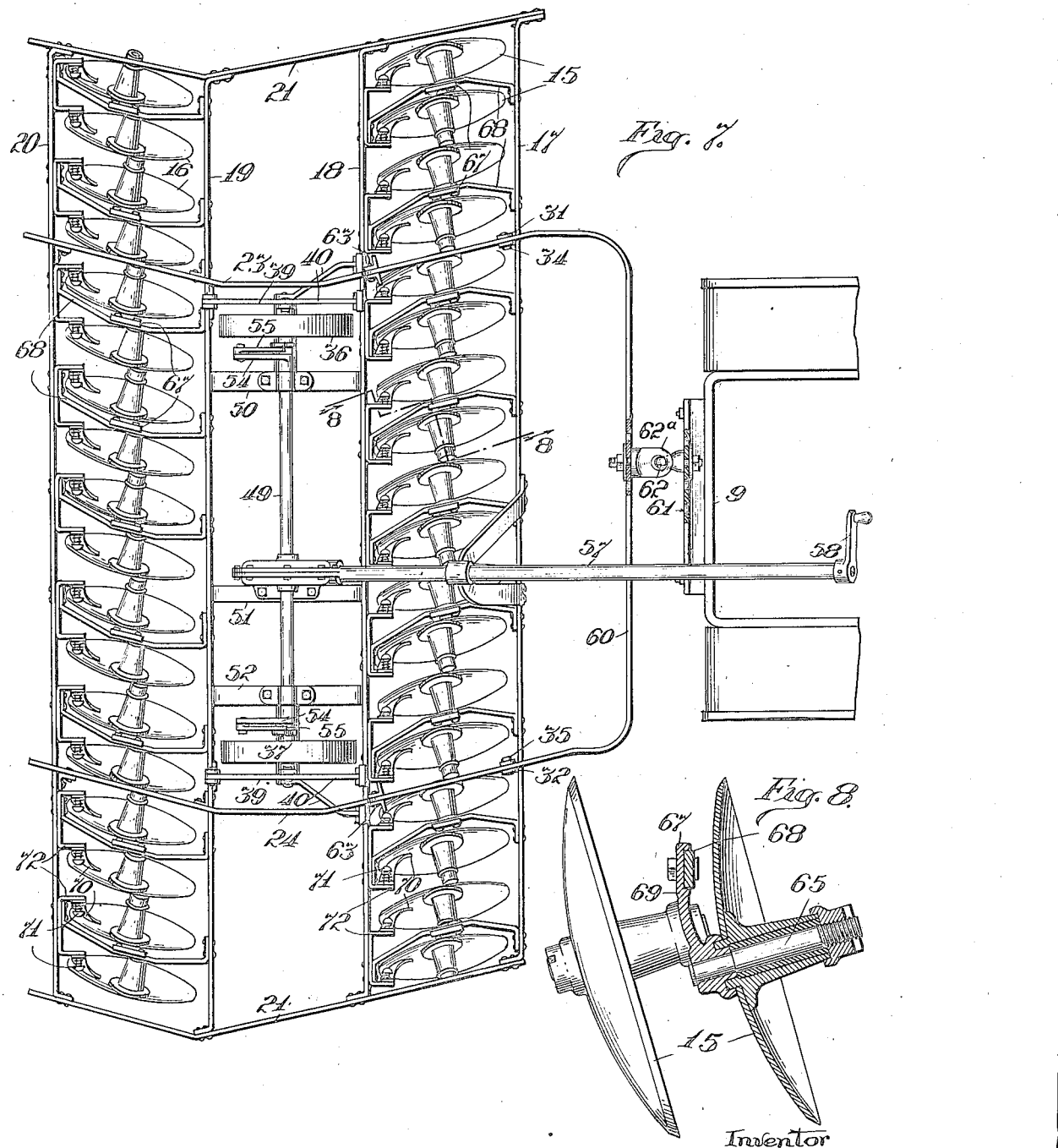

1,432,143

UNITED STATES PATENT OFFICE.

CHARLES E. WHITE, OF MOLINE, ILLINOIS.

TILLING IMPLEMENT.

Application filed November 22, 1918. Serial No. 263,699.

*To all whom it may concern:*

Be it known that I, CHARLES E. WHITE, a citizen of the United States, and a resident of Moline, in the county of Rock Island and State of Illinois, have invented certain new and useful Improvements in Tilling Implements, of which the following is a specification, reference being had to the accompanying drawings.

My invention relates to agricultural implements, and has particularly to do with implements, such as harrows, used for breaking up and levelling plowed land. It has for its object to provide an improved implement of this character which will level the soil and leave it approximately pulverized, and in which side draft will be practically eliminated; also to provide an implement of this description arranged to cooperate with and be drawn by a tractor, and which will be so constructed that the position of the soil pulverizing devices may be conveniently adjusted by the operator who drives the tractor without necessitating his dismounting therefrom. I accomplish these objects as illustrated in the drawings and as hereinafter described. What I regard as new will be set forth in the claims.

In the accompanying drawings:

Fig. 1 is a plan view of my improved implement, some parts being broken away;

Fig. 2 is a side elevation of the rear portion thereof;

Fig. 3 is a longitudinal vertical section on line 3—3 of Fig. 1;

Fig. 4 is a longitudinal vertical section on line 4—4 of Fig. 1;

Fig. 5 is a partial vertical cross section on line 5—5 of Fig. 4;

Fig. 6 is a partial horizontal section on line 6—6 of Fig. 4;

Fig. 7 is a partial plan view showing a slightly different arrangement of the soil-tilling discs; and Fig. 8 is a partial vertical section view on line 8—8 of Fig. 7.

Referring to the drawings:—9 indicates the frame of the tractor, 10 the traction wheels thereof, which are mounted on an axle 11, and 12 the front or steering wheels. The tractor shown in the drawings is preferably similar to that shown and described in my pending application, Serial No. 258,007, filed October 14, 1918, for improvements in harvesting machines, in which the tractor is driven by a steam engine, and is provided with means driven by the engine for steering the front wheels to turn the machine through a predetermined arc, and also with hand operated means for steering said wheels. So far as my present invention is concerned, however, it may be used with any other suitable type of tractor.

13 indicates a hand operated steering wheel which, as shown in Fig. 1, is located conveniently to the driver's seat 14.

15—16 indicate two series of concavo-convex discs which, as shown in Fig. 1, are arranged in two parallel rows disposed transversely of the implement, one row being behind the other and a short distance therefrom. These two series of discs are mounted in a frame composed of transverse bars 17—18—19—20, and end bars 21—22 and intermediate bars 23—24 to which said transverse bars are rigidly connected. The intermediate bars 23—24 extend a short distance forward from the transverse bar 17, as shown in Fig. 2, and serve as means for attaching draft bars 25—26 to the rear or disc frame. As shown in Fig. 2, the draft bars 26 are pivotally connected at their rear ends by pivots 27 with standards 28 which are secured to and rise from the bars 23—24, and the forward ends of said draft bars are provided with sleeves 29—30 which fit upon the ends of the axle 11, as shown in Fig. 1. Thus the draft is transmitted to the rear frame through said draft bars. As shown in Figs. 1 and 2, the forward end portions of the bars 23—24 are provided with yokes 31—32, between which the draft bars 25—26 pass, and said yokes are provided with a series of holes 33 adapted to receive transverse pins 34—35 which extend over or through the draft bars, as shown in Fig. 2. By this means the angular position of the rear frame with relation to the draft bars may be adjusted for the purpose of raising or lowering the front series of discs with relation to the rear series.

The rear frame is provided with two wheels 36—37 placed between the two series of discs and mounted upon a transverse shaft or axle 38, as shown in Fig. 1. Said shaft is connected with the rear frame by links 39—40, shown in Figs. 2 and 3. The links are connected at their upper ends to pivots 41, carried by brackets 42 secured to the transverse bar 19, and at their lower or forward ends they are connected by pivots 43 with cranks 44 loosely mounted on the end portions of the axle 38. The links 40 are pivotally connected with the transverse bar 18 by pivots 45 mounted in brackets 46 secured to said transverse bar. The lower or rear ends of the links 40 are connected by pivots 47 with cranks 48, also loosely mounted on the end portions of the axle 38. The two cranks 44—48 are in fixed relation to each other, and preferably they are made integral with each other in the form of a cross-head mounted intermediately upon said axle. The links 39—40 serve to hold the the axle 38 in position between the bars 18—19, while at the same time vertical adjustment of the rear frame with relation to said axle is permitted. For the purpose of vertically adjusting the rear frame, I provide a transverse shaft 49, which is mounted upon inverted U-shaped brackets 50—51—52 secured to the transverse bars 18—19, as shown in Fig. 1, and carries a worm gear 53, as shown in Fig. 4. Said shaft is also provided with a crank 54 connected by a pitman 55 with the axle 38. 56 indicates a worm which is mounted on the lower end of an operating shaft 57 and meshes with the worm gear 53, as shown in Fig. 4. The shaft 57 extends over the rear portion of the tractor frame to within easy reach of the driver's seat, and is provided with a crank 58, by which it may be rotated. 59 indicates an intermediate brace for the shaft 57 which rises from and is secured to the transverse bar 17. As will be seen from a comparison of Figs. 2, 3, and 4, when the rear frame is in its lowermost or operative position, the lower edges of the discs extend a considerable distance below the tread portions of the wheels 36—37, and at that time the crank 54 forms a pronounced angle with the pitman 55. By rotating the shaft 49 in a counterclockwise direction as viewed in Fig. 4, the crank 54 may be brought into alinement with the pitman 55, as shown in Fig. 3, thereby lifting the rear frame and the discs carried by it out of operative position. The links 39—40 serve to hold the axle 38 in position as above described, while at the same time they permit the rear frame to be raised and lowered without changing the fore and aft relation of the wheels relatively thereto. They also permit the rear frame to rock about the axle 38 as an axis to raise or lower one series of the discs with relation to the other. The worm and worm gear are made substantially irreversible so that the use of locking devices to hold the frame in its elevated position is unnecessary.

As shown in Fig. 1, the discs of one series are set oppositely with reference to the discs of the other series. That is to say, if the concavo-convex surface of the discs of the front series face to the right, the corresponding surfaces of the discs of the rear series face to the left. By this construction, not only is side draft practically eliminated, but also the soil is left substantially level as the two series of discs neutralize each other, since they throw the dirt in opposite directions. The rear frame, therefore, properly follows the tractor without substantial lateral strain upon the draft bars and their connections. In Fig. 7 I have shown a modified arrangement of the draft devices, in which, instead of using the two separate draft bars 25—26, I employ a U-shaped draft bar 60 which is pivotally connected to a bracket 61 secured to the rear frame of the tractor by a pivot 62, adjustably attached to the bracket 61, and a block 62ª adjustably secured to the draft bar, as shown. Thus the point of attachment of the rear frame to the tractor frame may be laterally adjusted either relatively to the tractor frame or relatively to the rear frame. In the construction shown in Fig. 7, however, I prefer to connect the rear ends of the draft bar 60 with the rear frame at points further back than as shown in Fig. 1, the rear ends of the draft bar 60 being secured by pivots 63 arranged substantially over the transverse bar 18, while the pins 34—35 are placed substantially over the bar 17.

The manner in which the discs are secured to the frame is best shown in Figs. 1, 5, and 6. As shown in Fig. 6, the discs are arranged in pairs, the discs of each pair being mounted upon spindles 64—65 secured at opposite sides of a standard 66 in staggered relation to each other. This standard is provided at its upper end with a horizontally-disposed socket member 67 which receives and is secured to a cross bar 68, the ends of which are fixedly connected with one of the pairs of parallel bars as 17—18. As clearly shown in Fig. 1, one of these bars 68 is provided for each pair of discs. In addition to supporting the standards 66, the bars 68 also serve as braces for the pairs of transverse bars, thus increasing the strength and rigidity of the rear frame. The discs shown in Fig. 1 are disposed perpendicularly to the surface of the ground, but, if desired, they may be set in an inclined position, as shown in Figs. 7-8, in which case, instead of using substantially straight standards 66, I employ curved standards 69, as shown in Fig. 8, the construction in other respects being the same. Each of the discs is provided with a scraper 70 formed of a curved elastic plate arranged to bear at one end against the concave surface of the disc, as shown in Fig. 4. The curved shank of the scraper is mounted upon a bolt 71 screwed into a bracket 72 secured to the transverse bar 18 or 20, as shown in Fig. 1. A spring 73 is mounted on the bolt 71 between the head of said bolt and the shank of the scraper so that it operates to yieldingly press the shank of the scraper against the bracket 72, thereby tending to rock said scraper so that its operating edge bears yieldingly against the disc. As shown in Fig. 5, the bracket 72 extends down some distance below the bolt 71, and the shank of the scraper is fulcrumed intermediately upon the downwardly-extending portion of the bracket so that the scraper operates after the manner of a lever. It is obvious that by adjusting the bolt 71, the pressure of the scraper against the disc may be varied.

What I claim as my invention and desire to secure by Letters Patent, is:—

1. A tilling implement comprising a frame, front and rear series of discs mounted in said frame and disposed transversely of the implement, and means mounted in said frame between the end portions thereof and between said series of discs for controlling the operating height of said discs.

2. A tilling implement comprising a frame, front and rear series of discs mounted in said frame and disposed transversely of the implement, wheels mounted in said frame between the end portions thereof and between said series of discs, and means for raising or lowering said frame with relation to said wheels.

3. A tilling implement comprising a frame, front and rear series of discs mounted in said frame and disposed in parallel rows arranged transversely of the implement, wheels mounted in said frame between the end portions thereof and between said series of discs, and means for moving said frame vertically with reference to said wheels.

4. A tilling implement comprising a frame, front and rear series of discs mounted to move vertically therewith and disposed transversely of the implement, wheels intermediately supporting said frame, means for raising or lowering said frame with relation to said wheels, and means for maintaining the wheels in constant fore and aft relation to said frame.

5. A tilling implement comprising a frame, front and rear series of discs mounted to move vertically with said frame and disposed transversely of the implement, a shaft mounted in said frame between said series of discs and extending transversely of the implement, wheels mounted on said shaft, means for raising or lowering said frame with reference to said wheels, oppositely extending cranks carried by said shaft, and links connecting said cranks with said frame at opposite sides of said shaft, whereby the wheels maintain a constant fore and aft position with reference to said frame.

6. A tilling implement comprising a frame, front and rear series of discs mounted in said frame and disposed transversely of the implement, a shaft mounted in said frame between said series of discs and extending transversely of the implement, wheels mounted on said shaft, oppositely extending cranks carried by said shaft, links connecting said cranks with said frame at opposite sides of said shaft, a worm and worm wheel, and means actuated thereby for raising or lowering said frame.

7. A tilling implement comprising a rigid frame, front and rear series of concavo-convex discs fixedly mounted in said frame and disposed in parallel rows arranged transversely of the implement, the discs in the rear row being set at an opposite angle to the line of draft with reference to the corresponding discs in the front row, and wheels mounted in said frame between the end portions thereof and between said rows of discs.

8. A tilling implement comprising a rigid frame, front and rear series of concavo-convex discs fixedly mounted in said frame and disposed in parallel rows arranged transversely of the implement, the discs in the rear row being set at an opposite angle to the line of draft with reference to the corresponding discs in the front row, wheels mounted in said frame between the end portions thereof and between said rows of discs, and means for vertically adjusting said frame with reference to said wheels.

9. A tilling implement comprising a rigid frame having front, rear and end members, transverse cross-bars adjacent to the front and rear members of said frame and fixedly secured to said end members, disc supporting bars connecting said cross-bars respectively at intervals with the front and rear members of the frame, standards secured to said cross-bars, and discs carried by said standards.

10. A tilling implement comprising a rigid frame, transverse cross-bars adjacent to the front and rear members of said frame, disc supporting bars connecting said cross-bars respectively at intervals with the front and rear members of the frame, standards secured to said cross-bars, and pairs of discs secured to each of said standards.

11. A tilling implement comprising a rigid frame, transverse cross-bars adjacent to the front and rear members of said frame, disc supporting bars connecting said cross-bars respectively at intervals with the front and rear members of the frame, standards secured to said cross-bars, and pairs of discs secured to each of said standards in offset relation to each other.

12. A tilling implement comprising a rigid frame, draft devices adapted to connect said frame with a tractor, front and rear series of discs mounted in said frame and disposed transversely of the implement, wheels supporting said frame, and means extending forward beyond the front series of discs and adapted to be operated from the tractor for raising or lowering said frame with reference to said wheels.

13. A tilling implement comprising a rigid frame, draft devices adapted to connect said frame with a tractor, front and rear series of discs mounted in said frame and disposed transversely of the implement, wheels mounted on said frame between the end portions thereof and between said series of discs, and forwardly extending means adapted to be operated from the tractor for raising or lowering said frame with reference to said wheels.

CHARLES E. WHITE.